United States Patent
Xin et al.

(10) Patent No.: US 12,231,274 B2
(45) Date of Patent: Feb. 18, 2025

(54) METHOD FOR CONFIGURING GUARD SUBCARRIERS

(71) Applicant: ZTE Corporation, Shenzhen (CN)

(72) Inventors: Yu Xin, Shenzhen (CN); Tong Bao, Shenzhen (CN); Jin Xu, Shenzhen (CN); Guanghui Yu, Shenzhen (CN); Liujun Hu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 346 days.

(21) Appl. No.: 17/740,863

(22) Filed: May 10, 2022

(65) Prior Publication Data

US 2022/0271981 A1 Aug. 25, 2022

Related U.S. Application Data (63) Continuation of application No. PCT/CN2019/119498, filed on Nov. 19, 2019.

(51) Int. Cl.
*H04L 27/26* (2006.01)

(52) U.S. Cl.
CPC .... *H04L 27/2605* (2013.01); *H04L 27/26025* (2021.01)

(58) Field of Classification Search
CPC ............ H04L 27/2605; H04L 27/26025; H04L 1/003
See application file for complete search history.

(56) References Cited

U.S. PATENT DOCUMENTS

| | | | |
|---|---|---|---|
| 2011/0207496 A1* | 8/2011 | Cho | H04L 5/0053 455/509 |
| 2012/0224866 A1* | 9/2012 | Gaete | H04B 10/27 398/186 |
| 2012/0287882 A1 | 11/2012 | Kim et al. | |

(Continued)

FOREIGN PATENT DOCUMENTS

| | | |
|---|---|---|
| CN | 101873697 A | 10/2010 |
| CN | 109644173 A | 4/2019 |
| CN | 109964463 A | 7/2019 |
| CN | 106688214 | 10/2019 |
| CN | 109792263 | 6/2021 |
| WO | WO 2018021008 | 2/2018 |

(Continued)

OTHER PUBLICATIONS

Office action in Canadian application No. 3,157,407, dated May 14, 2024, 4 pages.

(Continued)

*Primary Examiner* — Jamal Javaid
(74) *Attorney, Agent, or Firm* — Crowell & Moring LLP (57) ABSTRACT

This disclosure relates to methods and devices for configuring guard subcarriers in transmission subbands to reduce interband interference in a wireless communication network. In one implementation, the method may include determining that a first subcarrier spacing for a first radio frequency transmission band is less than a second subcarrier spacing for a second radio frequency transmission band, and the first radio frequency transmission band is close to the second radio frequency transmission band in frequency spectrum. The method may further include configuring a subcarrier of the first radio frequency transmission band as a guard subcarrier carrying dummy data when the first radio frequency transmission band and the second radio frequency transmission band are simultaneously used to transmit data loads.

19 Claims, 4 Drawing Sheets

(56) References Cited

U.S. PATENT DOCUMENTS

| | | | |
|---|---|---|---|
| 2018/0048435 | A1 | 2/2018 | Islam et al. |
| 2018/0049204 | A1* | 2/2018 | Nory .................... H04W 48/12 |
| 2018/0124791 | A1 | 5/2018 | Werner et al. |
| 2018/0152276 | A1 | 5/2018 | Hu et al. |
| 2019/0268198 | A1* | 8/2019 | Oketani ............. H04L 27/2607 |
| 2022/0271981 | A1 | 8/2022 | Xin et al. |

FOREIGN PATENT DOCUMENTS

| | | |
|---|---|---|
| WO | WO 2021/097677 A1 | 5/2021 |

OTHER PUBLICATIONS

Chinese Office Action issued Apr. 24, 2024 in corresponding Chinese Patent Application No. 201980102281.2 w/translation (15 pages).

Chinese Office Action issued Sep. 22, 2023 in corresponding Chinese Patent Application No. 201980102281.2.

Extended European Search Report issued Nov. 28, 2022 in corresponding European Patent Application No. 19953473.6.

Indian First Examination Report issued Feb. 2, 2023 in corresponding Indian Application No. 202217027385.

International Search Report and Written Opinion regarding PCT/CN2019/119498 dated Aug. 4, 2020.

Samsung. "Downlink Performance Evaluations for Guard-band Operation, RI-156801" 1-19 *3GPP TSG RAN WGJ Meeting #83*, 07 Nov. 7, 2015.

Canadian Examination Report issued Aug. 16, 2023 in corresponding Canadian Patent Application No. 3,157,407.

Korean Office Action issued Mar. 18, 2024 in corresponding Korean Patent Application No. 10-2022-7016394.

Office action in European application No. 19953473.6, dated Jun. 11, 2024, 5 pages.

* cited by examiner

FIG. 1

200 determining that a first subcarrier spacing for a first radio frequency transmission band is different than a second subcarrier spacing for a second radio frequency transmission band, the first radio frequency transmission band is close to the second radio frequency transmission band in frequency spectrum and the first subcarrier spacing is less than the second subcarrier spacing

210 configuring a subcarrier of the first radio frequency transmission band as a guard subcarrier carrying dummy data when the first radio frequency transmission band and the second radio frequency transmission band are simultaneously used to transmit data loads

METHOD FOR CONFIGURING GUARD SUBCARRIERS

This application is a continuation application of PCT International Application No. PCT/CN2019/119498, filed with the China National Intellectual Property Administration, PRC on Nov. 19, 2019, which is herein incorporated by reference in its entirety.

TECHNICAL FIELD

This disclosure is directed generally to wireless communications and particularly to configuring guard subcarriers in a transmission subband.

BACKGROUND

In a wireless communication network such as 5G new radio (NR) network, the communication technique adopts cyclic-prefix orthogonal frequency division multiplexing (CP-OFDM) waveforms as primary waveforms of subcarriers in radio frequency transmission subbands. In addition, the wireless communication network may use different numerologies in allocating radio resources for individual radio frequency transmission subbands. For example, adjacent transmission subbands in a channel bandwidth may have numerologies with different subcarrier spacing, which may, however, damage orthogonality among the subcarriers of the adjacent transmission subbands. As a result, mutual interference occurs between the adjacent transmission subbands.

To address the mutual interference, a straightforward method is to insert a guard band between two adjacent transmission subbands when they have different numerologies, which wastes radio resources. Moreover, the methods of windowing and filtering may suppress out-of-band leakage, but they have limited effects on alleviating interband interference.

SUMMARY

This disclosure is directed to methods, systems, and devices related to wireless communication, and more specifically, for configuring guard subcarriers in transmission subbands to reduce interband interference.

In one embodiment, a method for configuring guard subcarriers by an apparatus is disclosed. The method may include determining that a first subcarrier spacing for a first radio frequency transmission band is different than a second subcarrier spacing for a second radio frequency transmission band. The first radio frequency transmission band is close to the second radio frequency transmission band in frequency spectrum and the first subcarrier spacing is less than the second subcarrier spacing. The method may further include configuring a subcarrier of the first radio frequency transmission band as a guard subcarrier carrying dummy data when the first radio frequency transmission band and the second radio frequency transmission band are simultaneously used to transmit data loads.

In another embodiment, a device for wireless communication may include a memory storing instructions and a processing circuitry in communication with the memory. When the processing circuitry executes the instructions, the processing circuitry is configured to carry out the above method.

In another embodiment, a computer-readable medium comprising instructions which, when executed by a computer, cause the computer to carry out the above method.

The above and other aspects and their implementations are described in greater detail in the drawings, the descriptions, and the claims below.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1:
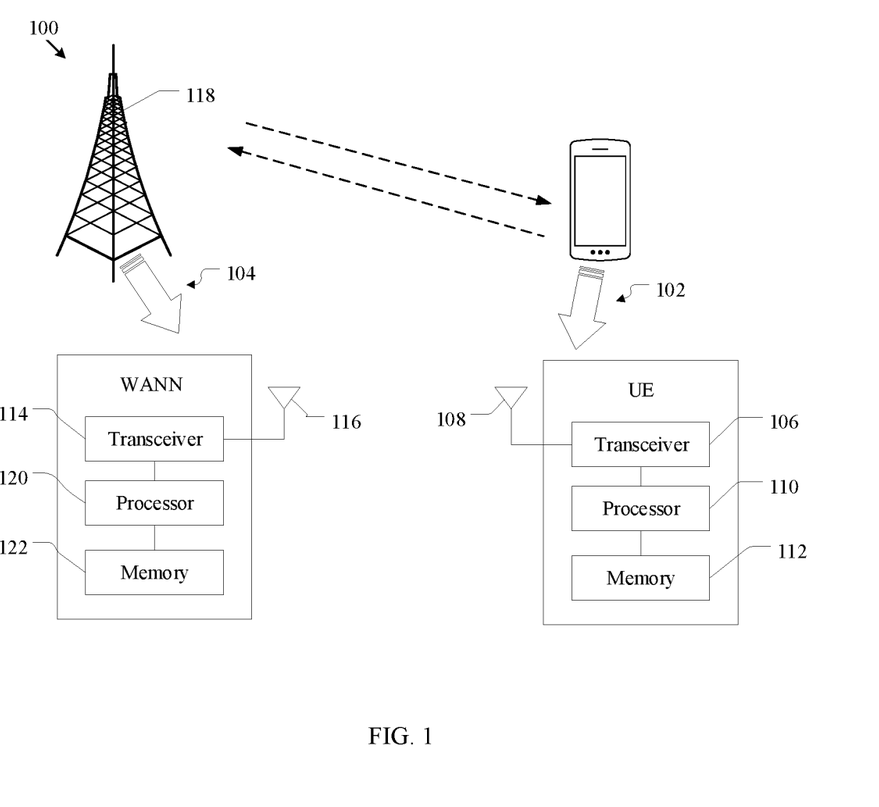
FIG. 1 illustrates an example diagram of a wireless communication network in accordance with various embodiments.

A wireless access network provides network connectivity between a user equipment and an information or data network such as a voice or video communication network, the Internet, and the like. An example wireless access network may be based on cellular technologies, which may further be based on, for example, 5G NR technologies and/or formats. FIG. 1 shows an example system diagram of wireless communication network 100 including a user equipment (UE) 102 and a wireless access network node (WANN) 104 according to various embodiments. The UE 102 may include but is not limited to a mobile phone, smartphone, tablet, laptop computer, a smart electronics or appliance including an air conditioner, a television, a refrigerator, an oven and the like, or other devices that are capable of communicating wirelessly over a network. The UE 102 may include transceiver circuitry 106 coupled to an antenna 108 to effect wireless communication with the wireless access network node 104. The transceiver circuitry 106 may also be coupled to a processor 110, which may also be coupled to a memory 112 or other storage devices. The memory 112 may store therein instructions or code that, when read and executed by the processor 110, cause the processor 110 to implement various ones of the methods described herein.

Similarly, the wireless access network node 104 may comprise a base station or other wireless network access points capable of communicating wirelessly over a network with one or more UEs. For example, the wireless access network node 104 may comprise a 5G NR base station, a 5G central-unit base station, or a 5G distributed-unit base station. Each type of these wireless access network nodes may be configured to perform a corresponding set of wireless network functions. The set of wireless network functions between different types of wireless access network nodes may not be identical. The set of wireless network functions between different types of wireless access network nodes, however, may functionally overlap. The wireless access network node 104 may include transceiver circuitry 114 coupled to an antenna 116, which may include an antenna tower 118 in various approaches, to effect wireless communication with the UE 102. The transceiver circuitry 114 may also be coupled to one or more processors 120, which may also be coupled to a memory 122 or other storage devices. The memory 122 may store therein instructions or code that, when read and executed by the processor 120, cause the processor 120 to implement various ones of the methods described herein.

For simplicity and clarity, only one WANN and one UE are shown in the wireless communication network 100. It will be appreciated that one or more WANNs may exist in the wireless communication network, and each WANN may serve one or more UEs in the meantime. Besides UEs and WANNs, the network 100 may further comprise any other network nodes with different functions such as the network nodes in core network of the wireless communication network 100. In addition, while various embodiments will be discussed in the context of the particular example wireless communication network 100, the underlying principle applies to other applicable wireless communication networks.

As shown in various embodiments below, the interband interference can be addressed by configuring one or more subcarriers in the adjacent transmission bands as guard subcarriers carrying dummy data. In this way, it may only insert a small guard bandwidth, or even no guard bandwidth, between the adjacent transmission bands thereby improving frequency spectrum utilization efficiency. Various exemplary embodiments addressing the interband interference based on such an underlying principle will be discussed in detail below with reference to FIGS. 2-6.

Figure 2:
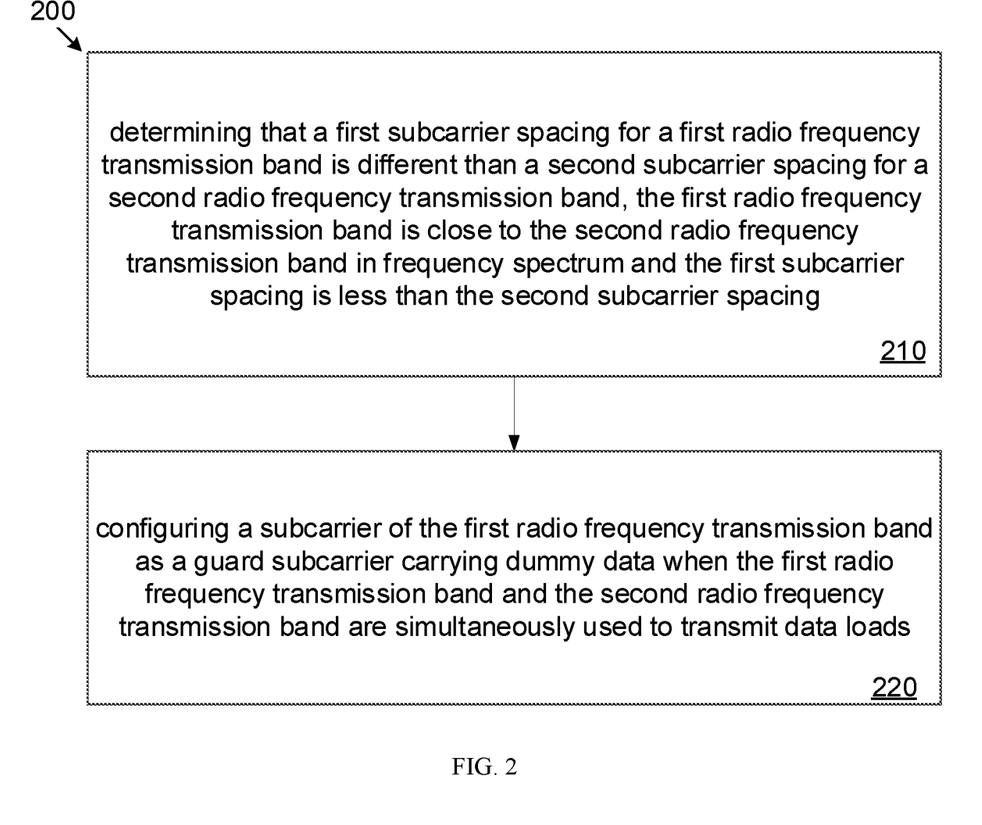
FIG. 2 illustrates a flow diagram of a method for configuring guard subcarriers in accordance with an embodiment.

FIG. 2 illustrates an exemplary implementation 200 of configuring guard subcarriers in a transmission band. Note that the exemplary implementation 200 may be performed by either a UE such as UE 102 or a wireless access network node such as WANN 104. As an example, the implementation is described as performed by the UE 102.

Figure 3:
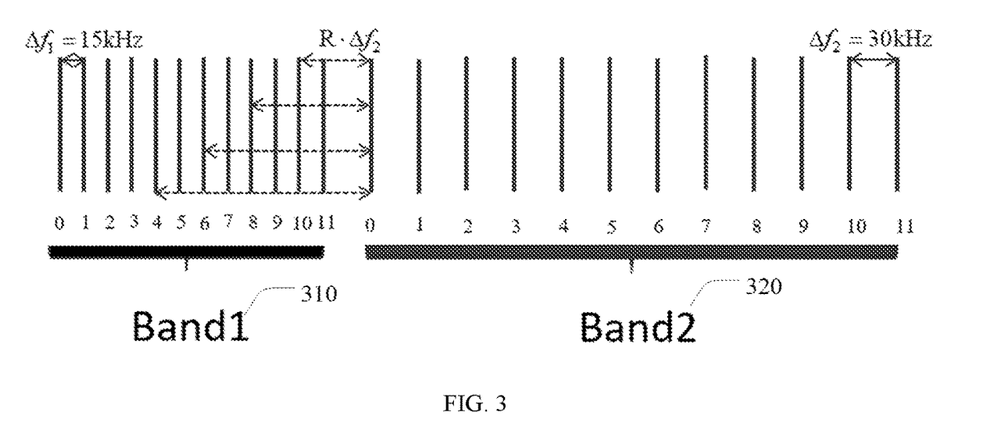
FIG. 3 illustrates an example diagram showing guard subcarriers in a transmission band in accordance with an embodiment.
Figure 4:
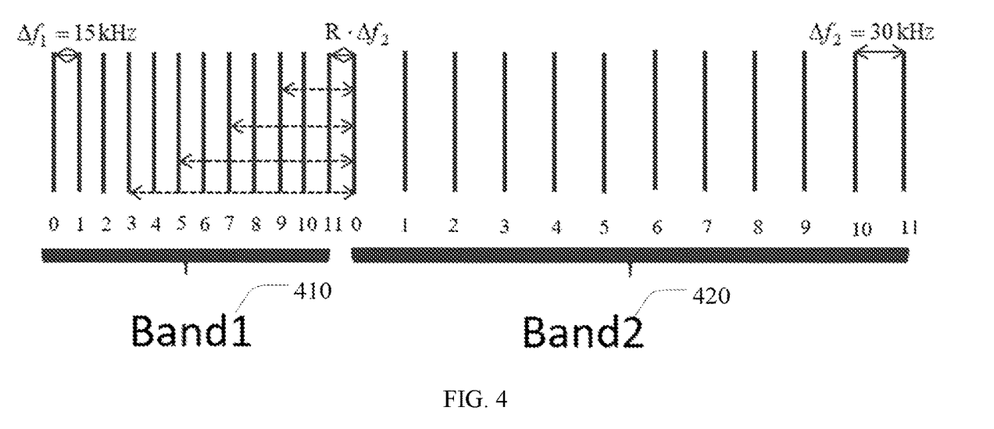
FIG. 4 illustrates an example diagram showing guard subcarriers in a transmission band in accordance with another embodiment.

At step 210, the UE 102 may determine that the transmission band 310 is close to the transmission band 320 in frequency spectrum and the subcarrier spacing for the transmission band 310 is less than the subcarrier spacing for the transmission band 320 as shown in FIG. 3. In some implementations, the transmission bands 310 and 320 include two subbands within a channel bandwidth. The UE 102 may, for example, receive this information on the transmission bands 310 and 320 from the WANN 104 which uses the two transmission bands to transmit downlink data to a plurality of UEs including the UE 102 or receiving uplink data from the plurality of UEs. For example, the UE 102 may use the transmission band 310 to transmit uplink data to the WANN 104.

In FIG. 3, the transmission band 310 is adjacent to the transmission band 320, i.e. there is not a third transmission band between the transmission band 310 and the transmission band 320. In other implementations, a third transmission band may be present between the transmission band 310 and the transmission band 320.

Figure 5:
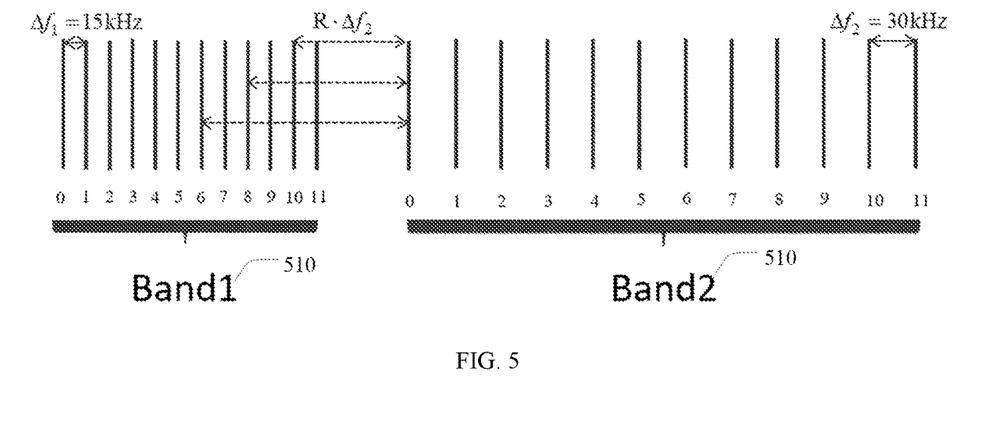
FIG. 5 illustrates an example diagram showing guard subcarriers in a transmission band in accordance with another embodiment.

The transmission bands 310 and 320 may, for example, have 12 subcarriers respectively numbering 0 through 11 as illustrated in FIG. 3. The subcarrier spacing $\Delta f_1$ for the transmission band 310 is 15 kHz and the subcarrier spacing $\Delta f_2$ for the transmission band 320 is 30 kHz. $\Delta f_1 < \Delta f_2$. As shown in FIG. 3, the frequency spacing between the transmission band 310 and the transmission band 320 is 30 kHz. It should be appreciated that the frequency spacing can be any other value. For example, in FIG. 4, the frequency spacing between the transmission band 410 and the transmission band 420 may be 15 kHz. In FIG. 5, the frequency spacing between the transmission band 510 and the transmission band 520 may be 60 kHz.

At step 220, the UE 102 may configure a subcarrier of the transmission band 310 as a guard subcarrier carrying dummy data when the transmission band 310 and the transmission band 320 are simultaneously used to transmit data loads. For example, the UE 102 and another UE (not shown) simultaneously transmit uplink data to the WANN 104, the UE 102 transmits uplink data in the transmission band 310 and the another UE transmits uplink data in the transmission band 320.

In view that the subcarriers of the transmission band 310 close to the transmission band 320 may give rise to more significant interference, it is desirable to configure one or more of these subcarriers as guard carriers.

Generally, when the frequency distance between a subcarrier of the transmission band 310 and a most edging subcarrier of the transmission band 320 close to the transmission band 310, i.e. subcarrier 0 of the transmission band 320, is an integral multiple of the subcarrier spacing $\Delta f_2$ of the transmission band 320, the subcarrier of the transmission band 310 is orthogonal to the subcarrier 0 and other subcarriers of the transmission band 320, thereby causing insignificant interference. Therefore, it may be not necessary in such a situation to configure this subcarrier of the transmission band 310 as a guard carrier.

By contrast, when the frequency distance between a subcarrier of the transmission band 310 and the subcarrier 0 of the transmission band 320 is a non-integral multiple of the subcarrier spacing $\Delta_2$, the subcarrier of the transmission band 310 is not orthogonal to the subcarrier 0 and other subcarriers of the transmission band 320, thereby causing interference. Therefore, this subcarrier of the transmission band 310 is desirable to be configured as a guard carrier. For example, as shown in FIG. 3, the subcarrier 10 of the transmission band 310 may be configured as a guard subcarrier because the frequency distance between the subcarrier 10 and the subcarrier 0 of the transmission band 320 is $1.5\Delta f_2$.

In some implementations, the UE 102 may determine whether to configure the guard subcarrier in the transmission band 310 based on the control message which may be a high-layer configuration signaling or received from the wireless communication network 100. For example, the WANN 104 may function to determine whether to configure guard subcarriers in individual transmission bands and transmit the determination result to the UE 102 in the control message. The control message can be transmitted in a control channel, in a radio resource control (RRC) signaling or in a broadcast channel.

In some implementations, a plurality of subcarriers of the transmission band may be configured as guard subcarriers. For example, subcarrier 4, subcarrier 6, subcarrier 8, and subcarrier 10 of the transmission band 310 in FIG. 3 are configured as guard subcarriers because the frequency distance between each of these subcarriers and the subcarrier 0 of the transmission band 320 is equal to $R*\Delta f_2$, R is a non-integer. Specifically, the frequency distance between subcarrier 10 of the transmission band 310 and the subcarrier 0 of the transmission band 320 is 45 kHz, i.e. $1.5*\Delta f_2$; the frequency spacing between subcarrier 8 of the transmission band 310 and the subcarrier 0 of the transmission band 320 is 75 kHz, i.e. $2.5*\Delta f_2$; the frequency spacing between subcarrier 6 of the transmission band 310 and the subcarrier 0 of the transmission band 320 is 105 kHz, i.e. $3.5*\Delta f_2$; and the frequency spacing between subcarrier 4 of the transmission band 310 and the subcarrier 0 of the transmission band 320 is 135 kHz, i.e. $4.5*\Delta f_2$. Similarly, subcarrier 3, subcarrier 5, subcarrier 7, subcarrier 9, and subcarrier 11 of the transmission band 410 in FIG. 4 may be configured as guard subcarriers. Subcarrier 6, subcarrier 8, and subcarrier 10 of the transmission band 510 in FIG. 5 may be configured as guard subcarriers.

The number of subcarriers to be configured as guard subcarriers N can be determined based on a control message which may be a high-layer configuration signaling or received from a network node in the wireless communication network 100 such as the WANN 104. The control message may include, for example, the value of the N, a message type having a predetermined correspondence to the value of the N, and a parameter for a predetermined formula used to calculate the value of the N. Where the control message includes the message type, the UE 102 may look up a local mapping table between message types and values of the N to get the value of the N. Where the control message includes the parameter, the UE 102 may use the predetermined formula to calculate the value of the N. Such control message can be transmitted in a control channel, in a RRC signaling or in a broadcast channel.

Alternatively, the number of subcarriers to be configured as guard subcarriers N can be determined based on, but not limited to, a modulation and coding scheme (MCS) used for transmission in the transmission band 310 or the transmission band 320. The MCS may include but not limited to a modulation order or a code rate. Generally, the higher the modulation order is, the higher the desired signal to noise ratio (SNR) is. To achiver higher SNR, less interference is required which results in a larger N, i.e. more guard subcarriers. Likewise, a higher code rate requires a higher SNR, and thereby a larger N.

In some implementations, the N guard subcarriers in the transmission band are discrete subcarriers. For example, the transmission band 310 in FIG. 3 has subcarrier 4, subcarrier 6, subcarrier 8, and subcarrier 10 as guard subcarriers which have interval non-guard subcarriers, i.e. subcarrier 5, subcarrier 7, and subcarrier 9. The transmission band 410 in FIG. 4 has subcarrier 3, subcarrier 5, subcarrier 7, subcarrier 9, and subcarrier 11 as guard subcarriers which have interval non-guard subcarriers, i.e. subcarrier 4, subcarrier 6, subcarrier 8, and subcarrier 10. The transmission band 510 in FIG. 5 has subcarrier 6, subcarrier 8, and subcarrier 10 as guard subcarriers which have interval non-guard subcarriers, i.e. subcarrier 7 and subcarrier 9.

Figure 6:
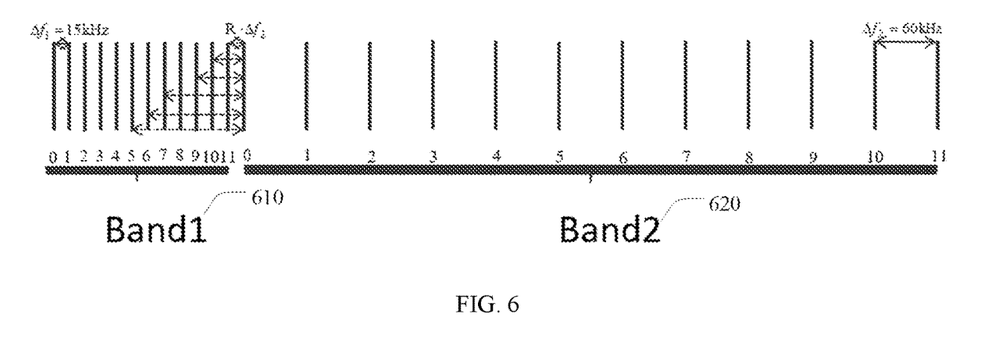
FIG. 6 illustrates an example diagram showing guard subcarriers in a transmission band in accordance with another embodiment.

In some implementations, a portion of the N guard subcarriers in the transmission band is continuous subcarriers. For example, as shown in FIG. 6, the subcarrier spacing $\Delta f_1$ of the transmission band 610 is 15 kHz and the subcarrier spacing $\Delta_2$ of the transmission band 620 is 60 kHz. $\Delta f_2 > 2*\Delta f_1$. The frequency spacing between the transmission band 610 and the transmission band 620 is 15 kHz. In this case, subcarrier 5, subcarrier 6, subcarrier 7, subcarrier 9, subcarrier 10, and subcarrier 11 of the transmission band 610 may be configured as guard subcarriers because their frequency distances to subcarrier 0 of the transmission band 620 are non-integral multiple of the subcarrier spacing $\Delta f_2$ of the transmission band 620, i.e. $1.75\Delta f_2$, $1.5\Delta f_2$, $1.25\Delta f_2$, $0.75\Delta f_2$, $0.5\Delta f_2$, and $0.25\Delta f_2$ respectively. As such, subcarrier 5, subcarrier 6, and subcarrier 7 constitute a series of continuous guard subcarriers and subcarrier 9, subcarrier 10, and subcarrier 11 constitute the other series of continuous guard subcarriers.

Return to FIG. 3, for subcarrier 9 and subcarrier 11 of the transmission band 310, their frequency distances to subcarrier 0 of the transmission band 320 are integral multiple of the subcarrier spacing $\Delta f_2$ of the transmission band 320, i.e. $\Delta f_2$ and $2\Delta f_2$ respectively, thereby being orthogonal to the subcarrier 0 of the transmission band 320 as discussed above. Although subcarrier 9 and subcarrier 11 may not give rise to significant interference, this interference may not be negligible due to the closeness to the subcarrier 0 of the transmission band 320. In turn, subcarrier 9 and subcarrier 11 may also be interfered by the transmission band 320. Therefore, in another implementation, aside from configuring the N subcarriers of a transmission band as guard subcarriers as discussed above, the UE 102 may configure additional M subcarriers of the transmission band 310 close to the transmission band 320 as guard subcarriers. M is an integer and M<N. Take an example with reference to FIG. 3, in addition to four guard subcarriers, i.e. subcarrier 4, subcarrier 6, subcarrier 8, and subcarrier 10 in the transmission band 310, the UE 102 configures two more subcarriers, subcarrier 9 and subcarrier 11, in the transmission band 310 as guard subcarriers. As such, subcarrier 4 and subcarrier 6 are discrete guard subcarriers, and subcarrier 8, subcarrier 9, subcarrier 10, and subcarrier 11 are continuous guard subcarriers.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by an apparatus in a wireless communication network, comprising:
   determining that a first subcarrier spacing for a first radio frequency transmission band is different than a second subcarrier spacing for a second radio frequency transmission band, wherein the first subcarrier spacing is less than the second subcarrier spacing; and
   configuring a subcarrier of the first radio frequency transmission band as a guard subcarrier carrying dummy data when the first radio frequency transmission band and the second radio frequency transmission band are simultaneously used to transmit data loads,
   wherein a frequency distance between the subcarrier and a most edging subcarrier in the second radio frequency transmission band is a non-integral multiple of a value of the second subcarrier spacing, wherein the most edging subcarrier is at an edge of the second radio frequency transmission band and has a least frequency distance to the first radio frequency transmission band among subcarriers in the second radio frequency transmission band.

2. The method of claim 1, wherein the subcarrier is at an edge of the first radio frequency transmission band.

3. The method of claim 1, further comprising determining whether to configure the subcarrier of the first radio frequency transmission band as the guard subcarrier based on a control message received from the wireless communication network.

4. The method of claim 1, wherein the configuring the subcarrier in the first radio frequency transmission band as a guard subcarrier comprises configuring N subcarriers in the first radio frequency transmission band as guard subcarriers, wherein N is an integer.

5. The method of claim 4, wherein the N subcarriers are discrete subcarriers.

6. The method of claim 4, wherein a portion of the N subcarriers are continuous subcarriers when a value of the second subcarrier spacing is greater than two times of a value of the first subcarrier spacing.

7. The method of claim 4, wherein the N subcarriers are at an edge of the first radio frequency transmission band close to the second radio frequency transmission band.

8. The method of claim 4, wherein a frequency distance between each of the N subcarriers and a most edging subcarrier in the second radio frequency transmission band is a non-integral multiple of a value of the second subcarrier spacing, wherein the most edging subcarrier is at an edge of the second radio frequency transmission band and has a less frequency distance to the first radio frequency transmission band than other subcarriers in the second radio frequency transmission band.

9. The method of claim 8, further comprising configuring M subcarriers in the first radio frequency transmission band as guard subcarriers, wherein M is an integer and M<N, wherein the M subcarriers are at an edge of the first radio frequency transmission band and have less frequency distances to the second radio frequency transmission band than other subcarriers in the first radio frequency transmission band, and a frequency distance between each of the M subcarriers and the most edging subcarrier of the second radio frequency transmission band is an integral multiple of the value of the second subcarrier spacing.

10. The method of claim 9, wherein a portion of the N+M subcarriers are discrete subcarriers.

11. The method of claim 4, further comprising determining a value of the N based on a control message received from the wireless communication network.

12. The method of claim 11, wherein the control message comprises the value of the N, a message type having a predetermined correspondence to the value of the N, or a parameter for a predetermined formula used to calculate the value of the N.

13. The method of claim 4, further comprising determining a value of the N at least based on a modulation and coding scheme for transmission in the first radio frequency transmission band or the second radio frequency transmission band.

14. The method of claim 13, wherein the modulation and coding scheme comprises at least one of a modulation order and a code rate.

15. The method of claim 1, wherein the apparatus is a user equipment or a wireless network node.

16. The method of claim 1, wherein the first radio frequency transmission band and the second radio frequency transmission band are subbands in a channel bandwidth.

17. An apparatus comprising:
   a memory operable to store computer-readable instructions; and
   a processor circuitry operable to read the computer-readable instructions, the processor circuitry when executing the computer-readable instructions is configured to:
      determine that a first subcarrier spacing for a first radio frequency transmission band is different than a second subcarrier spacing for a second radio frequency transmission band, wherein the first subcarrier spacing is less than the second subcarrier spacing; and
      configure a subcarrier of the first radio frequency transmission band as a guard subcarrier carrying dummy data when the first radio frequency transmission band and the second radio frequency transmission band are simultaneously used to transmit data loads,
      wherein a frequency distance between the subcarrier and a most edging subcarrier in the second radio frequency transmission band is a non-integral multiple of a value of the second subcarrier spacing, wherein the most edging subcarrier is at an edge of the second radio frequency transmission band and has a least frequency distance to the first radio frequency transmission band among subcarriers in the second radio frequency transmission band.

18. The apparatus of claim 17, wherein the processor circuitry is configured to configure N subcarriers in the first radio frequency transmission band as guard subcarriers, wherein N is an integer.

19. A non-transitory machine-readable media, having instructions stored on the machine readable media, the instructions configured to, when executed, cause a machine to:

determine that a first subcarrier spacing for a first radio frequency transmission band is different than a second subcarrier spacing for a second radio frequency transmission band, wherein the first subcarrier spacing is less than the second subcarrier spacing; and configure a subcarrier of the first radio frequency transmission band as a guard subcarrier carrying dummy data when the first radio frequency transmission band and the second radio frequency transmission band are simultaneously used to transmit data loads, wherein a frequency distance between the subcarrier and a most edging subcarrier in the second radio frequency transmission band is a non-integral multiple of a value of the second subcarrier spacing, wherein the most edging subcarrier is at an edge of the second radio frequency transmission band and has a least frequency distance to the first radio frequency transmission band among subcarriers in the second radio frequency transmission band.

\* \* \* \* \*